United States Patent [19]

Sanok, Jr.

[11] 4,155,579
[45] May 22, 1979

[54] ROTATING DETENT LATCH MECHANISM

[75] Inventor: John S. Sanok, Jr., Arnold, Md.

[73] Assignee: The United States of America as represented by the Secretary of the Air Force, Washington, D.C.

[21] Appl. No.: 840,332

[22] Filed: Oct. 7, 1977

[51] Int. Cl.² ............................................. E05C 13/04
[52] U.S. Cl. .................................................. 292/336.3
[58] Field of Search .................... 292/336.3, 179, 263, 292/206, 113, 69, 1, 226

[56] References Cited

U.S. PATENT DOCUMENTS

| | | | |
|---|---|---|---|
| 2,046,790 | 7/1936 | Phillips | 292/179 |
| 3,536,349 | 10/1970 | Gardner et al. | 292/179 X |
| 3,891,253 | 6/1975 | Renell | 292/336.3 |

FOREIGN PATENT DOCUMENTS 19262 of 1892 United Kingdom ..................... 292/206

Primary Examiner—Richard E. Moore
Attorney, Agent, or Firm—Joseph E. Rusz; Arsen Tashjian

[57] ABSTRACT

A compact, easily fabricated mechanism which provides a latching and unlatching function in a small volume and through a restricted access. The mechanism offers a positive detent for the latch position, and a forced movement to the unlatched position. It is operable by access through a single hole by use of a simple hexagonal stock tool. For remote actuation the mechanism provides a reliable one-time-only unlatching motion.

4 Claims, 6 Drawing Figures

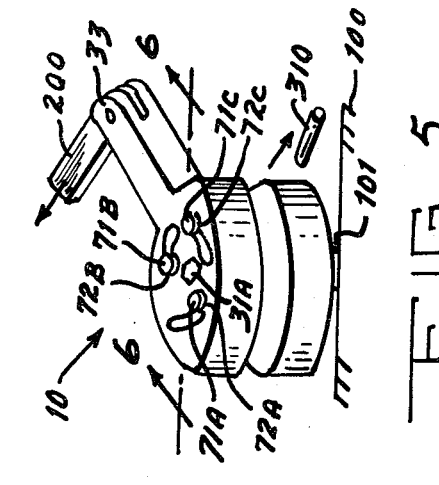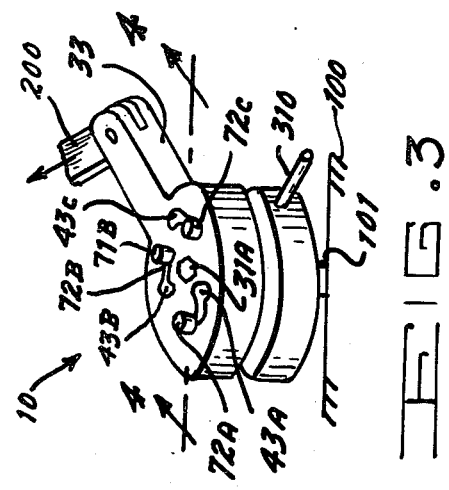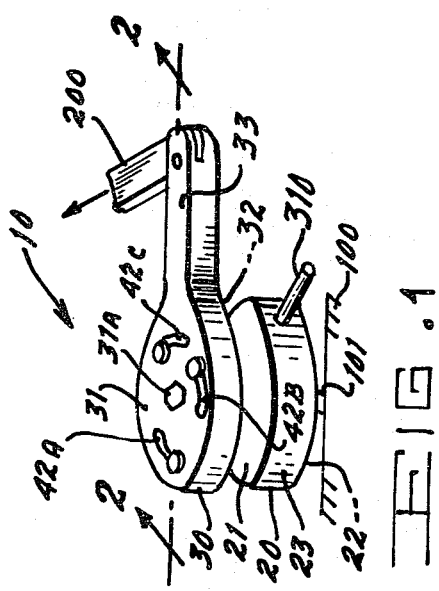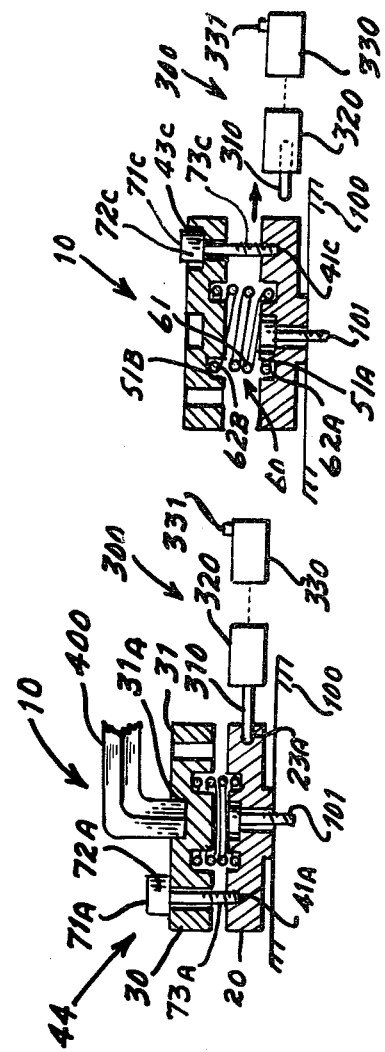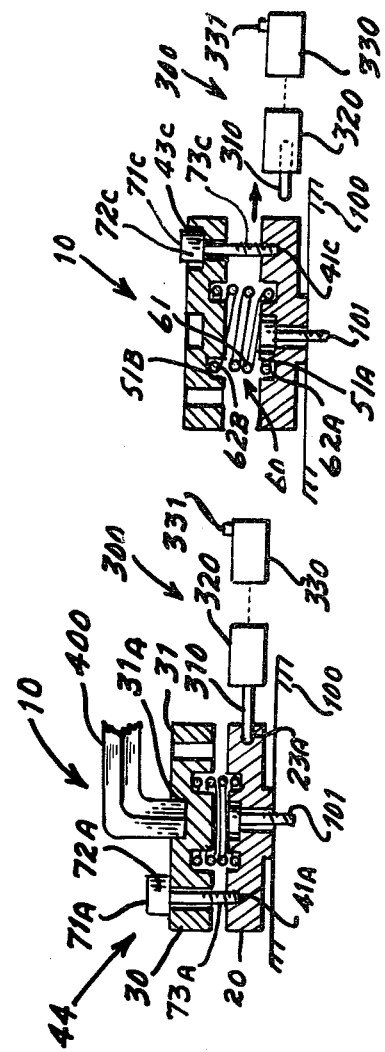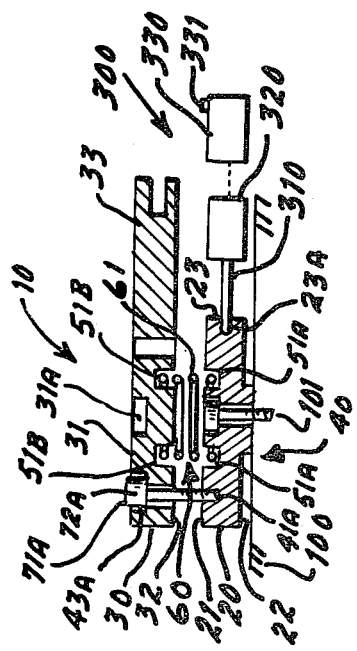

ROTATING DETENT LATCH MECHANISM

STATEMENT OF GOVERNMENT INTEREST

This invention described herein may be manufactured and used by or for the Government for governmental purposes without the payment of any royalty thereon.

BACKGROUND OF THE INVENTION

This invention relates to a latch mechanism and, more particularly to rotating body, and with a linkage that is biased and is urged away from the mchanism, and also with a remotely actuatable locking and unlocking assembly having a retractable locking pin.

A need has arisen for a latch mechanism that will satisfy several complicating requirements. The latch mechanism must be operable locally through many cycles; and, must be operable remotely for only one cycle. The allocated location, space, and weight of the latch mechaism, as well as access restrictions, and high "g" and vibration levels are further limitations.

Specifically, the latching mechanism is for use in a system which, in turn, is part of a package to be included in a space satellite. Before the launch into space, the latch mechanism will be frequently latched and unlatched locally to allow other parts of the system to "be checked out" and operated. Since the overall system is weight and volume critical, and also since the latching mechanism is to be a "minor" portion of the system, the latching mechanism has been allocated a minimum of each. Additionally, access to the latch mechanism is complicated by the fact that surrounding components, and covering layers of material, partially block access to it. Further, the latch mechanism must survive the tough launch environment of high "g" loading and severe vibration. Also, the latch mechanism must operate in the zero "g" vacuum of space.

I have invented a unique latching mechanism that satisfies all of these requirements; and, in doing so, I have significantly advanced the state-of-the-art.

SUMMARY OF THE INVENTION

My invention provides for a latching mechanism that can be operated many times locally and one time remotely, and that is compact, reliable, simple to operate, easy to operate through a restricted access, and is inexpensive to manufacture, in addition to being useable and reliable during high "g" loading, in a zero "g" environment, and during severe vibration.

Accordingly, the principal object of this invention is to teach the structure of such a unique latching mechanism.

This object, as well as other related objects of this invention, will become readily apparent after a consideration of the description of the invention, together with reference to the Figures of the drawings.

DESCRIPTION OF THE DRAWINGS

FIG. 1 is a perspective view, partially pictorial and partially schematic, and in simplified form of a preferred embodiment of the invention in the latched position;

FIG. 2 is a side elevation view, in simplified form, partially cross sectional, partially schematic, and partially pictorial, of the preferred embodiment, as seen along line 2—2 in FIG. 1;

FIG. 3 is a perspective view, partially pictorial and partially schematic, and in simplified form of the preferred embodiment of the invention in the local unlatched position;

FIG. 4 is a side elevation view, in simplified form, partially cross sectional, partially schematic, and partially pictorial, of the preferred embodiment, as seen along line 4—4 in FIG. 3;

FIG. 5 is a perspective view, partially pictorial and partially schematic, and in simplified form of the preferred embodiment of the invention in the remote unlatched position; and, FIG. 6 is a side elevation view, in simplified form, partially cross sectional, partially schematic, and partially pictorial, of the preferred embodiment, as seen along line 6—6 in FIG. 5.

DETAILED DESCRIPTION OF THE PREFERRED EMBODIMENT

With reference to FIGS. 1-6, therein is shown, in simplified form, a preferred embodiment 10 of my invention in three different positions, i.e., latched, FIGS. 1 and 2; locally unlatched, FIGS. 3 and 4, and remotely unlatched, FIGS. 5 and 6.

It is here reiterated and emphasized: that my invention is to be operated (i.e., latched and unlatched) many timeslocally, and only one time remotely; and, that my invention is adapted for use with a body, such as 100, FIGS. 1-6, and for use with a linkage, such as 200, FIGS. 1, 3 and 5, which is biased and is urged away from my inventive mechanism 10, as shown by the directional arrow in FIGS. 1, 3 and 5, and also for use with a remotely actuatable locking and unlocking retractable pin assembly, such as 300, FIGS. 2, 4 and 6, having a retractable locking pin 310 that is withdrawable by the activation of local unit 320 which, in turn, is activated and is actuated by conventional means, such as push-button 331 on remote unit 330 that, in turn, is linked to local unit 320.

Still with reference to FIGS. 1-6, inclusive, my invention comprises, in the most basic and generic form: a first (i.e., lower) member 20, removably and rotatably attached to the body 100 by suitable means, such as pin or screw 101, with this first (i.e., lower member 20 having a first surface 21, a second (i.e., lower) surface 22, by which the first member 20 is removably attached to the body 100 by pin or screw 101 and a third (i.e. side) surface 23, with a cavity 23A in the third surface 23 that is dimensioned and configurated to accept the retractable locking pin 310 of the remotely actuatable locking and unlocking assembly 300; a second (i.e., upper) member 30 disposed adjacent to the first (i.e., upper) member 20 and having a first surface 31 with a cavity 31A therein of preselected configuration, preferably hexagonal, and a second (i.e., lower) surface 32, and also an arm portion 33 pivotally connected to the biased linkage 200; and, means (generally designated 40, FIG. 2) for captively, releasably, and rotatably holding the second member 30 to the first member 20.

The holding means 40 includes: a plurality, preferably three, of threaded cavities (such as 41A, FIG. 2; and, 41C, FIG. 6); a plurality, preferably three, of arcuate-like shaped slots (such as 42A, 42B and 42C, FIG. 1) in and through the first surface 31 of the second member 30, with each of the slots having a detent (such as detent 43A, FIGS. 1 and 3, for slot 42A; 43B, FIG. 3, for slot 42B; and, 43C, FIGS. 3 and 6, for slot 42C); means (generally designated 44) for releasably connecting the plurality of threaded cavities (such as 41A, FIG. 2, and 41C, FIG. 6) in the first member 20 to the plurality of arcuate-like shaped slots (such as 42A and 42C, FIG. 1) in the second member 30 and also to the detent (such as 43A and 43C, FIG. 3) of each slot; a circular groove (such as 51A, FIG. 2) in the first surface 21 of the first member 20; a circular groove (such as 51B, FIG. 2) in the second surface 32 of the second member 30; and, means (such as 60, FIGS. 2 and 6) for releasably connecting the circular groove 51A in the first member 20 with and to the circular groove 51B in the second member 30.

The means 44 for releasably connecting the plurality of threaded cavities (e.g., 41A, FIG. 2, and 41C, FIG. 6) in the first member 20 to the plurality of arcuate-like shaped slots (e.g., 42A and 42C, FIG. 1) in the second member and also to the detents (e.g., 43A and 43C, FIG. 3), includes, preferably, a plurality of shoulder screws (such as: 71A, FIGS. 2, 4 and 5; 71B, FIGS. 3 and 5; and, 71C, FIGS. 5 and 6), with each shoulder screw having a shoulder-head portion (such as: 72A, FIGS. 2, 4 and 5, for screw 71A; 72B, FIGS. 3 and 5, for screw 71B; and, 72C, FIGS. 5 and 6, for screw 71C) and a threaded shank portion (such as: 73A, FIG. 4, for screw 71A; and, 73C, FIG. 6, for screw 71C), with each threaded shank portion having threads complementary to, fitting into, and mating with a different one of the plurality of threaded cavities (such as 41A, FIG. 2, and 41C, FIG. 6) in the first surface 21 of the first member 20, and with the shoulder-head portion of each screw fitting into a different one of the plurality of arcuate-like shaped slots (such as 42A and 42C, FIG. 1) in the second member 30, and also with the shoulder-head portion of each screw movable into the detent of that respective different slot (e.g., shoulder-head portion 72A of screw 71A, FIG. 4, fits into arcuate-like shaped slot 42A, FIG. 1, and is selectively movable into the detent 43A, FIG. 3, of that slot 42A).

The means 60, FIGS. 2 and 6, for releasably connecting the circular groove 51A in the first member 20 with the circular groove 51B in the second member 30, comprises a resilient member 61, FIGS. 2 and 6, under compression, such as a circular spring under compression, with the member 61 having a first end, such as 62A, FIG. 6, fitting into and abutting with the circular groove 51A in the first member 20, and also having a second end such as 62B, FIG. 6, fitting into and abutting with the circular groove 51B in the second member 30. The spring 61 functions to force the second member 30 against the shoulder-head portion of the screws in the detent position; and, the spring 61 is sized to prevent the second member 30 from moving under anticipated vibration levels.

The cavity 31A, FIGS. 1–5, in the first surface 31 of the second member 30, is of a preselected configuration, as previously stated, and that configuration is preferably of a hexagon. Therefore, a complementary hexagonally-shaped element 400, FIG. 4, such as an Allen wrench, fits into and releasably mates with the cavity 31A, with the result that the second member 30 can be rotated with, and by the use of, the mating element 400.

MANNER OF OPERATION OF THE PREFERRED EMBODIMENT

The manner of operation of the preferred embodiment 10 of my invention, both as to local operation (i.e., latching and unlatching) and as to remote operation, can be easily ascertained by any person of ordinary skill in the art from the foregoing descriptin, coupled with reference to the Figures of the drawings.

For others, the manner of operation, briefly stated is as follows:

For repeated local operation, and with reference to FIGS. 3 and 4, the pin assembly 300 (and specifically pin 310) prevents the first member 20 from rotating. Therefore, the second member 30 is rotated to provide or permit the latching and unlatching. To unlatch, the second member 30 is depressed (such as by hand) against spring 61 until the shoulder-head portions 72A, 72B and 72C of the screws 71A, 71B and 71C clear their respective detents 43A, 43B and 43C (see FIGS. 4 and 5). As a result, the linkage 200 which is biased (i.e., spring loaded) then rotates the second member 30 to the unlatched position. To latch, the Allen wrench 400, FIG. 4, is inserted into cavity 31A of second member 30, and the second member 30 is rotated until the detents 43A, 43B and 43C are under the shoulder-head portions 72A, 72B and 72C of screws 71A, 71B and 71C. Then, the second member 30 is forced up and around the detents, and around the shoulder-head portion of the screws, by the spring 61, thereby locking the latch mechanism in place.

For the one-time-only remote unlatching operation, and with reference to FIGS. 2, 4 and 6, the push-button 331 (or switch or the like) on remote unit 330 is depressed (or closed or the like). As a result, the local unit 320 (to which the remote unit 330 is linked) is activated, and the retactable locking pin 310 is actuated (i.e., is withdrawn or otherwise pulled back) from cavity 23A of first member 20, thereby unlatching the mechanism. The locking pin 310, in the retracted position, is shown in FIGS. 5 and 6. It is here reiterated that this remote unlatching is a one-time-only operation.

CONCLUSION

It is abundantly clear from all of the foregoing, and from the Figures of the drawings, that the stated principal object, as well as other related objects, of the invention have been achieved.

It is to be noted that, although there have been described the fundamental and unique features of my invention as applied to a preferred embodiment, various other embodiments, variations, adaptations, substitutions, additions, omissions, and the like may occur to, and can be made by, those of ordinary skill in the art, without departing from the spirit of my invention.

What is claimed is:

1. A rotating detent latch mechanism, adapted for use with a body, wherein said mechanism is in combination with:
   a. a linkage that is biased and is urged away from said mechanism;
   b. and, a remotely actuatable locking and unlocking assembly having a retractable locking pin;
   and, wherein said mechanism comprises:
   (1) a first member removably and rotatably attached to said body, wherein said first member has a second surface by which it is removably and rotatably attached to said body, and wherein said first member has a third surface with a cavity therein that is dimensioned and configurated to accept said retractable locking pin of said remotely actuatable locking and unlocking assembly;
   (2) a second member disposed adjacent to said first member, wherein said second member has an arm portion pivotally connected to said biased linkage;

(3) and, means for captively, releasably and rotatably holding said second member to said first member, wherein this said means includes:

(a) a plurality of threaded cavities in a first surface of said first member;

(b) a plurality of arcuate-shaped slots in and through a first surface of said second member, with one slot for each of said plurality of threaded cavities in said first surface of said first member, and with each slot having a detent;

(c) means for releasably connecting said plurality of threaded cavities in said first surface of said first member to said plurality of arcuate-shaped slots in said first surface of said second member and also to said detent of each said slot;

(d) and, means for releasably connecting a circular groove in said first surface of said first member with, and to, a circular groove in a second surface of said second member, wherein this said means includes a first surface, on said second member, having a cavity therein of preselected configuration, in which said cavity a complementarily shaped tool can be inserted to assist in rotating said second member.

2. A rotating detent latch mechanism, as set forth in claim 1, wherein said means for connecting said plurality of threaded cavities in said first member to said plurality of arcuate-like shaped slots, with detents, in said second member includes a plurality of shoulder screws, each having a shoulder-head portion and a threaded shank portion, with each threaded shank portion complementary to, fitting into, and mating with a different one of said plurality of threaded cavities in said first member, and with said shoulder-head portion of each said screw fitting into a different one of said plurality of arcuate-like shaped slots in said second member, and also with said shoulder-head portion movable into said detent of said slot.

3. A rotating detent latch mechanism, as set forth in claim 2, wherein said means for releasably connecting said circular groove in said first member to said circular groove in said second member is a circular spring under compression, having a first end fitting into and abutting with said circular groove in said first member, and having a second end fitting into and abutting with said circular groove in said second member.

4. A rotating detent latch mechanism, as set forth in claim 3, wherein said cavity in said first surface of said second member is of the preselected configuration of a hexagon, thereby allowing a complementary hexagonally-shaped element to fit into and releasably mate with said cavity, whereby said second member may be rotated with and by the use of said element.

* * * * *